(12) United States Patent
Jo et al.

(10) Patent No.: US 12,489,159 B2
(45) Date of Patent: Dec. 2, 2025

(54) BATTERY CELL, BATTERY MODULE COMPRISING SAME BATTERY CELL, AND BATTERY PACK COMPRISING SAME BATTERY MODULE

(71) Applicant: LG Energy Solution, Ltd., Seoul (KR)

(72) Inventors: Jong-Hyun Jo, Daejeon (KR); Jeong-In Pak, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 804 days.

(21) Appl. No.: 17/762,560

(22) PCT Filed: Sep. 11, 2020

(86) PCT No.: PCT/KR2020/012343
§ 371 (c)(1),
(2) Date: Mar. 22, 2022

(87) PCT Pub. No.: WO2021/075733
PCT Pub. Date: Apr. 22, 2021

(65) Prior Publication Data
US 2022/0344754 A1 Oct. 27, 2022

(30) Foreign Application Priority Data
Oct. 14, 2019 (KR) .................. 10-2019-0127253

(51) Int. Cl.
*H01M 50/14* (2021.01)
*H01M 50/533* (2021.01)

(52) U.S. Cl.
CPC ......... *H01M 50/14* (2021.01); *H01M 50/533* (2021.01)

(58) Field of Classification Search
CPC .. H01M 50/14; H01M 50/533; H01M 50/178; H01M 50/531; H01M 50/591;
(Continued)

(56) References Cited

U.S. PATENT DOCUMENTS

| 6,743,546 B1 | 6/2004 | Kaneda et al. |
| 2009/0263712 A1 | 10/2009 | Mizuta et al. |

(Continued)

FOREIGN PATENT DOCUMENTS

| CN | 1316114 A | 10/2001 |
| CN | 1350338 A | 5/2002 |

(Continued)

OTHER PUBLICATIONS

English translation of KR101495294B1 (Year: 2015).*

(Continued)

*Primary Examiner* — Ula C Ruddock
*Assistant Examiner* — Sarika Gupta
(74) *Attorney, Agent, or Firm* — Lerner David LLP (57) ABSTRACT

Disclosed is a battery cell, which includes a battery case, a battery assembly accommodated in the battery case, an electrode lead electrically connected to the battery assembly and configured to protrude out of the battery case, an electrode tab disposed in the battery case and configured to protrude from the battery assembly to connect the electrode lead and the battery assembly, and a tab protection unit configured to at least partially surround an outer surface of the battery case corresponding to a portion where the electrode tab is disposed.

10 Claims, 8 Drawing Sheets

(58) Field of Classification Search
CPC ............. H01M 50/105; H01M 50/572; H01M 50/116; H01M 50/20; H01M 2200/00; Y02E 60/10
See application file for complete search history.

(56) References Cited

U.S. PATENT DOCUMENTS

| | | |
|---|---|---|
| 2009/0297942 A1 | 12/2009 | Jang et al. |
| 2011/0117404 A1* | 5/2011 | Ahn ................ H01M 50/16 429/94 |
| 2013/0149600 A1 | 6/2013 | Park et al. |
| 2013/0330606 A1 | 12/2013 | Kwon et al. |
| 2019/0001838 A1 | 1/2019 | Choi et al. |
| 2019/0348727 A1 | 11/2019 | Yoon et al. |
| 2020/0212495 A1 | 7/2020 | Lee et al. |

FOREIGN PATENT DOCUMENTS

| | | | |
|---|---|---|---|
| CN | 101405894 A | | 4/2009 |
| JP | 2001-057191 A | | 2/2001 |
| JP | 200359472 A | | 2/2003 |
| JP | 2011-070975 A | | 4/2011 |
| JP | 2013537691 A | | 10/2013 |
| JP | 2016-225153 A | | 12/2016 |
| JP | 2019511810 A | | 4/2019 |
| KR | 20040038094 A | | 5/2004 |
| KR | 100960619 B1 | | 6/2010 |
| KR | 20120015905 A | | 2/2012 |
| KR | 20130050616 A | | 5/2013 |
| KR | 20130065290 A | | 6/2013 |
| KR | 101495294 B1 | * | 2/2015 |
| KR | 20150050210 A | | 5/2015 |
| KR | 20170041967 A | | 4/2017 |
| KR | 20170050445 A | | 5/2017 |
| KR | 20180082748 A | * | 7/2018 |
| KR | 20180136176 A | | 12/2018 |
| WO | 2016017048 A1 | | 2/2016 |
| WO | 2018016774 A1 | | 1/2018 |
| WO | 2018230819 A1 | | 12/2018 |
| WO | 2019045552 A1 | | 3/2019 |

OTHER PUBLICATIONS

English translation of KR20180082748A (Year: 2018).*
International Search Report for PCT/KR2020/012343 dated Dec. 18, 2020. 3 pgs.
Extended European Search Report including Written Opinion for Application No. 20876667.5 dated Oct. 31, 2023, pp. 1-11.
Search Report dated Sep. 21, 2023 from the Office Action for Chinese Application No. 202080058732.X issued Sep. 23, 2023, pp. 1-3.

* cited by examiner

BATTERY CELL, BATTERY MODULE COMPRISING SAME BATTERY CELL, AND BATTERY PACK COMPRISING SAME BATTERY MODULE

CROSS-REFERENCE TO RELATED APPLICATIONS

The present application is a national stage entry under 35 U.S.C. § 371 of International Application No. PCT/KR2020/012343, filed on Sep. 11, 2020, published in Korean, which claims priority to Korean Patent Application No. 10-2019-0127253, filed on Oct. 14, 2019, the disclosures of which are incorporated herein by reference in their entireties.

TECHNICAL FIELD

The present disclosure relates to a battery cell, a battery module including the battery cell, and a battery pack including the battery module.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack by using at least one battery module and adding other components.

The conventional battery cell generally includes a battery case forming an appearance, a battery assembly accommodated in the battery case, an electrode lead electrically connected to the battery assembly and the protruding out of the battery case, and an electrode tab protruding from the battery assembly to connect the electrode lead and the battery assembly. The conventional battery case generally includes a case body for accommodating the battery assembly and a case terrace extending from the case body and protruding the electrode lead. Here, the electrode tab of the conventional battery cell is generally disposed inside the case terrace extending from the case body for the connection between the battery assembly and the electrode lead.

However, in the conventional battery cell, when an external impact occurs to the case terrace in which the electrode tab is accommodated, the external impact may be transmitted to the electrode tab as it is, thereby increasing the possibility of damage to the electrode tab.

In addition, in the conventional battery cell, when damage to the case terrace, such as tearing of the case terrace, occurs due to the external impact, the electrode tab included in the case terrace may also be damaged together.

Accordingly, it is needed to provide a battery cell capable of protecting the electrode tab from an external impact or the like, a battery module including the battery cell, and a battery pack including the battery module.

DISCLOSURE

Technical Problem

The present disclosure is directed to providing a battery cell capable of protecting an electrode tab from an external impact or the like, a battery module including the battery cell, and a battery pack including the battery module.

Technical Solution

In one aspect of the present disclosure, there is provided a battery cell, comprising: a battery case configured to form an appearance of the battery cell; a battery assembly accommodated in the battery case; an electrode lead electrically connected to the battery assembly and configured to protrude out of the battery case; an electrode tab disposed in the battery case and configured to protrude from the battery assembly to connect the electrode lead and the battery assembly; and a tab protection unit configured to at least partially surround an outer surface of the battery case corresponding to a portion where the electrode tab is disposed so that the electrode tab is protected from an external impact.

The tab protection unit may be configured to cover at least one of an upper surface, a lower surface and both side surfaces of the battery case.

The battery case may include a case body configured to accommodate the battery assembly; and a case terrace extending from the case body and configured to accommodate the electrode tab and the electrode lead and protrude the electrode lead at least partially, and the tab protection unit may be inserted into the case terrace and configured to cover the case body at least partially.

The case terrace may include a first terrace configured to accommodate the electrode tab; and a second terrace extending from the first terrace and configured to protrude the electrode lead at least partially, and the tab protection unit may be configured to cover the first terrace at least partially.

The tab protection unit may be configured to cover an upper surface and a lower surface of the first terrace.

The tab protection unit may be configured to cover the upper surface and the lower surface of the first terrace at least dually, respectively.

The tab protection unit may be configured to cover both side surfaces of the first terrace.

The tab protection unit may be elastically mounted to the battery case.

In another aspect of the present disclosure, there is also provided a battery module, comprising: at least one battery cell according to the former embodiments; and a module case configured to accommodate the at least one battery cell.

In still another aspect of the present disclosure, there is also provided a battery pack, comprising: at least one battery module according to the former embodiment; and a pack case configured to package the at least one battery module.

Advantageous Effects

According to various embodiments as described above, there is provided a battery cell capable of protecting an electrode tab from an external impact or the like, a battery module including the battery cell, and a battery pack including the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
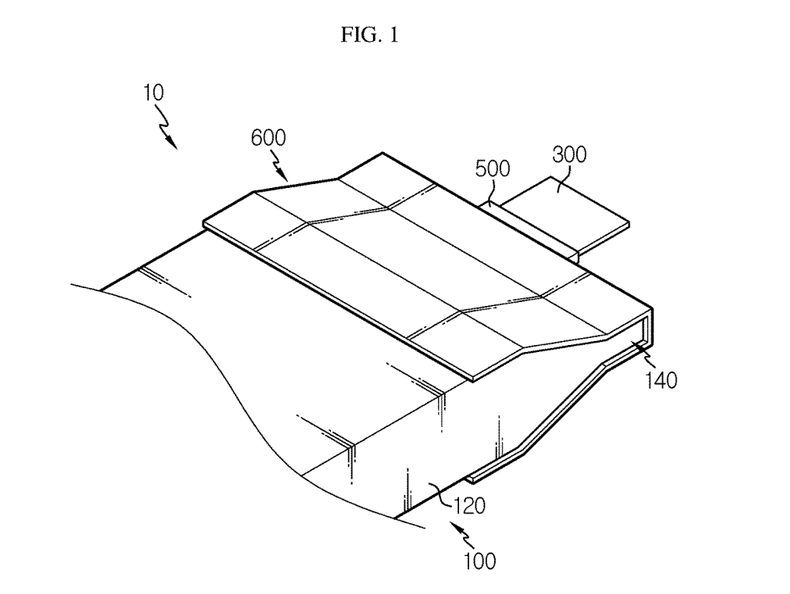
FIG. 1 is a diagram for illustrating a battery cell according to an embodiment of the present disclosure.
Figure 2:
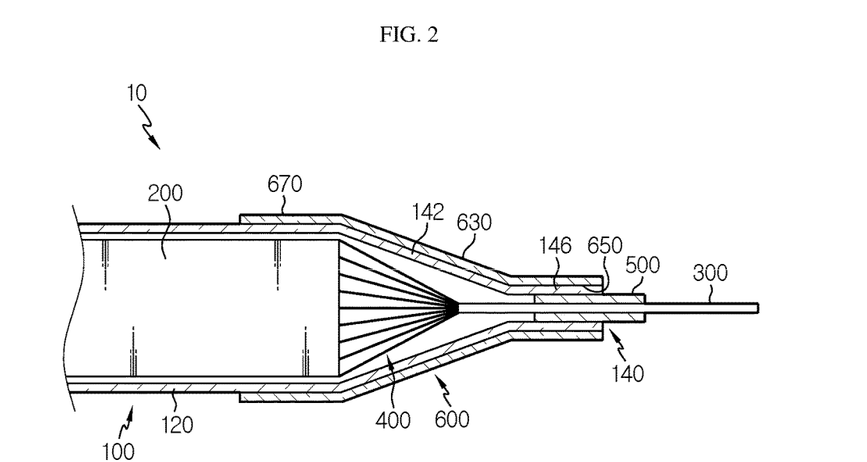
FIG. 2 is a side sectional view showing the battery cell of FIG. 1.
Figure 3:
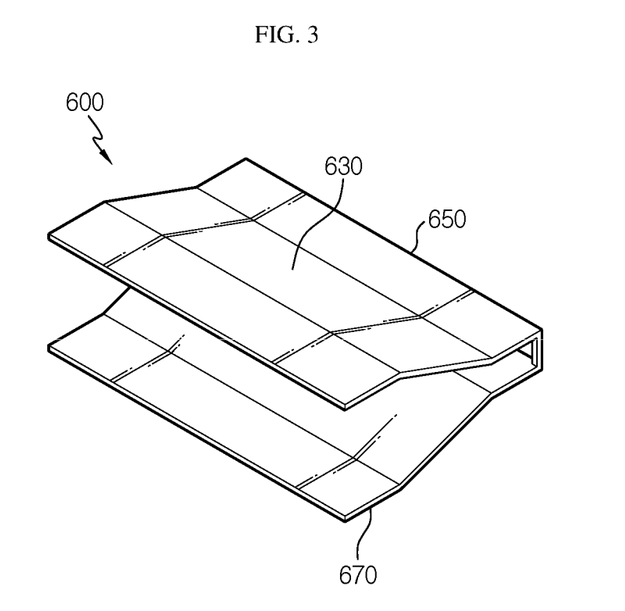
FIGS. 3 and 4 are diagrams for illustrating a tab protection unit of the battery cell of FIG. 1.
Figure 4:
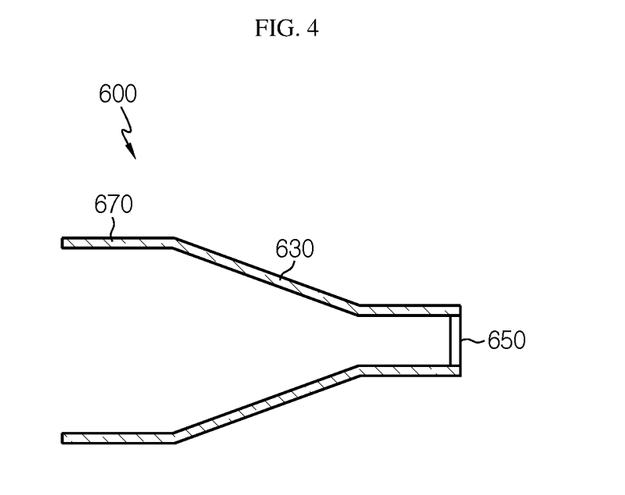

FIG. 1 is a diagram for illustrating a battery cell according to an embodiment of the present disclosure, FIG. 2 is a side sectional view showing the battery cell of FIG. 1, and FIGS. 3 and 4 are diagrams for illustrating a tab protection unit of the battery cell of FIG. 1.

Referring to FIGS. 1 to 4, a battery cell 10 is an energy source of a portable electronic device such as a smart phone or a vehicle such as an electric vehicle or a hybrid electric vehicle, and may be provided in these devices. The battery cell 10 may be provided as a secondary battery, for example a pouch-type secondary battery. Hereinafter, in this embodiment, it will be described that the battery cell 10 is the pouch-type secondary battery.

The battery cell 10 may include a battery case 100, a battery assembly 200, an electrode lead 300, an electrode tab 400, a sealing tape 500, and a tab protection unit 600.

The battery case 100 forms an appearance of the battery cell 10, and may package the battery assembly 200, the electrode lead 300 and the electrode tab 400, explained later, therein. The battery case 100 may be provided in the form of an aluminum pouch. In the aluminum pouch, an aluminum thin film may be interposed between an insulating layer made of a polymer material and an adhesive layer.

The battery case 100 may include a case body 120 and a case terrace 140.

The case body 120 may accommodate the battery assembly 200, explained later. To this end, an accommodation space capable of accommodating the battery assembly 200, explained later, may be provided in the case body 120.

The case terrace 140 extends from the case body 120 and may accommodate the electrode tab 400 and the electrode lead 300, explained later. The case terrace 140 may partially protrude the electrode lead 300, explained later.

The case terrace 140 may include a first terrace 142 and a second terrace 146.

The first terrace 142 extends from the case body 120 and may accommodate the electrode tab 400, explained later. The second terrace 146 extends from the first terrace 142 and may at least partially protrude the electrode lead 300, explained later.

The battery assembly 200 is accommodated in the battery case 100, specifically in the case body 120, and may include a positive electrode plate, a negative electrode plate, a separator, and the like.

The electrode lead 300 is electrically connected to the battery assembly 200, and may protrude out of the electric case 100, specifically out of the second terrace 146 of the case terrace 140. The electrode lead 300 may be provided in a pair, and the pair of electrode leads 300 may be provided as a positive electrode lead and a negative electrode lead.

The electrode tab 400 protrudes from the battery assembly 200 to connect the electrode lead 300 and the battery assembly 200, and may be disposed inside the battery case 100. Specifically, the electrode tab 400 may be disposed inside the first case 142 of the case terrace 140.

Specifically, the electrode tab 400 includes a positive electrode tab and a negative electrode tab, and may be formed to protrude from the battery assembly 200, respectively. That is, the positive electrode tab may be formed to protrude from the positive electrode plate of the battery assembly 200, and the negative electrode tab may be formed to protrude from the negative electrode plate of the battery assembly 200.

The positive electrode tab and the negative electrode tab of the electrode tab 400 may be provided in plural, respectively. In this case, the plurality of positive electrode tabs may be connected to the positive electrode lead of the electrode lead 300, and the plurality of negative electrode tabs may be connected to the negative electrode lead of the electrode lead 300.

The sealing tape 500 is provided corresponding to the number of the electrode leads 300, and may be provided in the second terrace 146. The sealing tape 500 may prevent the occurrence of a short circuit in the electrode lead 300 and improve the sealing power of the battery case 100.

The tab protection unit 600 may at least partially surround an outer surface of the battery case 100 corresponding to a portion where the electrode tab 400 is disposed, so as to protect the electrode tab 400 from an external impact.

The tab protection unit 600 may cover at least one of an upper surface, a lower surface, and both side surfaces of the battery case 100. Here, the tab protection unit 600 may be elastically mounted to the battery case 100.

Specifically, the tab protection unit 600 may be inserted onto the case terrace 140 to at least partially cover the case terrace 140 and the case body 120. The tab protection unit 600 may at least partially cover the first terrace 142, and specifically, may cover upper and lower surfaces of the first terrace 142.

Hereinafter, the tab protection unit 600 according to this embodiment will be described in more detail.

The tab protection unit 600 may include a terrace covering portion 630, a terrace slot 650, and a body covering portion 670.

The terrace covering portion 630 may at least partially cover the case terrace 140 of the battery case 100. Specifically, the terrace covering portion 630 may cover the upper and lower surfaces of the first terrace 142 and the second terrace 146.

The terrace slot 650 may be formed at the terrace covering portion 630. Through the terrace slot 650, the tab protection unit 600 may be inserted into and mounted to the battery case 100. Through the terrace slot 650, the tab protection unit 600 may be mounted to the battery case 100 in a more simple and easy way.

The body covering portion 670 extends from the terrace covering portion 630 and may at least partially cover the case body 120 of the battery case 100. The body covering portion 670 may be elastically mounted to the upper and lower surfaces of the case body 120.

As described above, in the battery cell 10 according to this embodiment, by means of the tab protection unit 600 surrounding the case terrace 140 of the battery case 100 in which the electrode tab 400 is disposed, when an external impact occurs, the external impact may be absorbed and buffered preferentially by the tab protection unit 600.

Accordingly, when an external impact is applied to the case terrace 140 in which the electrode tab 400 is accommodated, the battery cell 10 according to this embodiment may significantly reduce the risk of damage to the electrode tab 400 by minimizing the transmission of the external impact to the electrode tab 400.

In addition, the battery cell 10 according to this embodiment may also minimize the risk of damage such as tearing of the case terrace 140, since the tab protection unit 600 directly receives the impact primarily when the external impact occurs.

Figure 5:
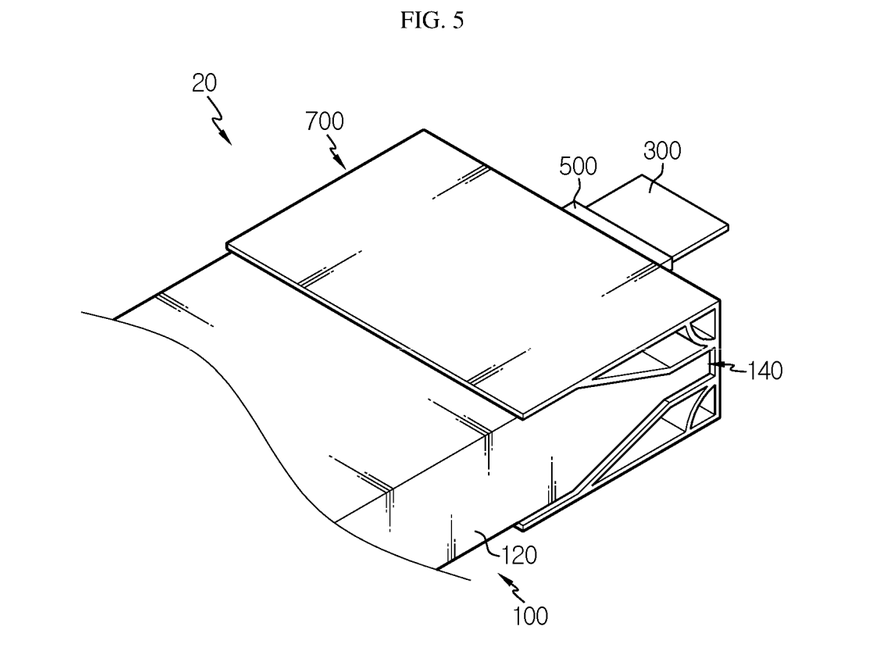
FIG. 5 is a diagram for illustrating a battery cell according to another embodiment of the present disclosure.
Figure 6:
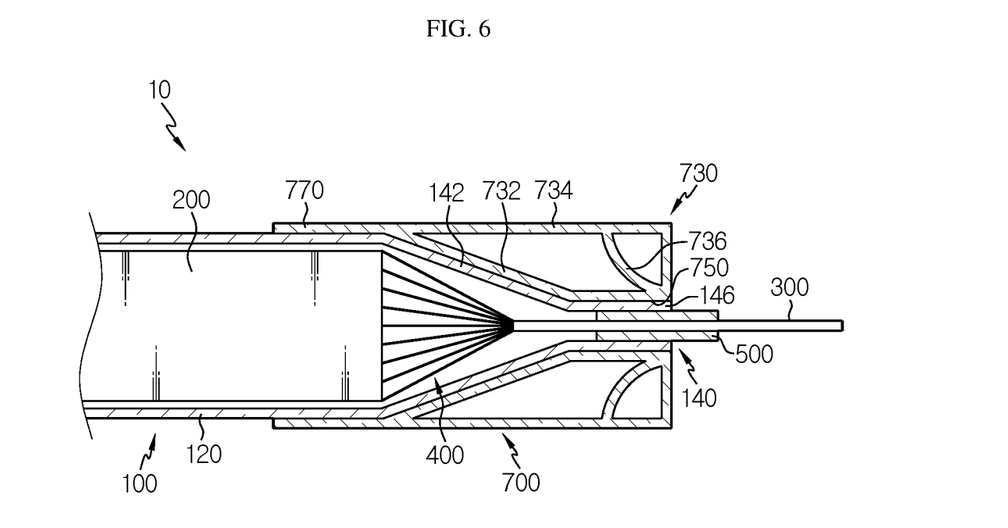
FIG. 6 is a side sectional view showing the battery cell of FIG. 5.
Figure 7:
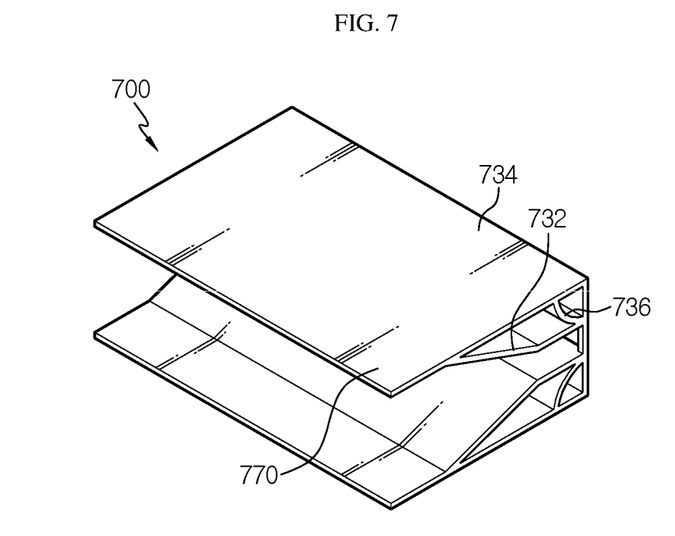
FIGS. 7 and 8 are diagrams for illustrating a tab protection unit of the battery cell of FIG. 5.
Figure 8:
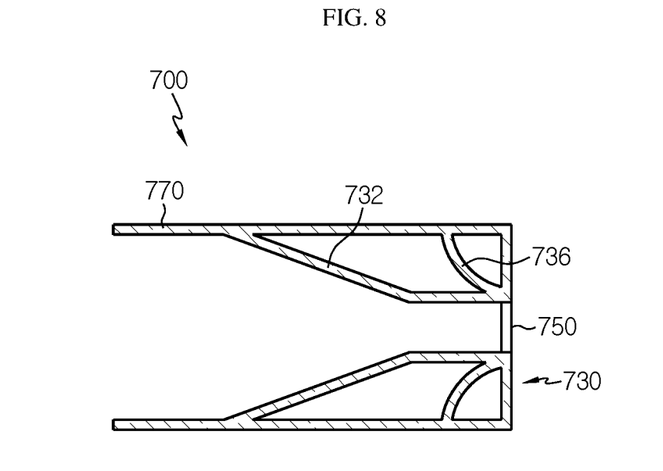

FIG. 5 is a diagram for illustrating a battery cell according to another embodiment of the present disclosure, FIG. 6 is a side sectional view showing the battery cell of FIG. 5, and FIGS. 7 and 8 are diagrams for illustrating a tab protection unit of the battery cell of FIG. 5.

The battery cell 20 according to this embodiment is similar to the battery cell 10 of the former embodiment, and thus, hereinafter, features substantially identical or similar to the former embodiment will not be described in detail, and features different from the former embodiment will be described in detail.

Referring to FIGS. 5 to 8, the battery cell 20 may include a battery case 100, a battery assembly 200, an electrode lead 300, an electrode tab 400, a sealing tape 500, and a tab protection unit 700.

The battery case 100, the battery assembly 200, the electrode lead 300, the electrode tab 400 and the sealing tape 500 are substantially identical or similar to the former embodiment, and thus will not be described again.

The tab protection unit 700 may cover the upper and lower surfaces of the first terrace 142 and the second terrace 146 of the case terrace 140 of the battery case 100, respectively, at least dually.

The tab protection unit 700 may include a terrace covering portion 730, a terrace slot 750, and a body covering portion 770.

The terrace covering portion 730 may include a first covering part 732, a second covering part 734, and an auxiliary buffering part 736.

The first covering part 732 may cover the first terrace 142 and the second terrace 146 of the case terrace 140. The second covering part 734 is disposed to be spaced apart from the first covering part 732 by a predetermined distance and may cover the first covering part 732.

The auxiliary buffering part 736 is provided between the first covering part 732 and the second covering part 734, and when an external impact occurs, the auxiliary buffering part 736 may buffer an impact transmitted to the first covering part 732.

The terrace slot 750 and the body covering portion 770 are similar to the former embodiment and thus will be described again.

As described above, in the battery cell 20 according to this embodiment, since the tab protection unit 700 covers the case terrace 140 of the battery case 140 at least dually, the protective effect of the electrode tab 400 may be further maximized.

Figure 9:
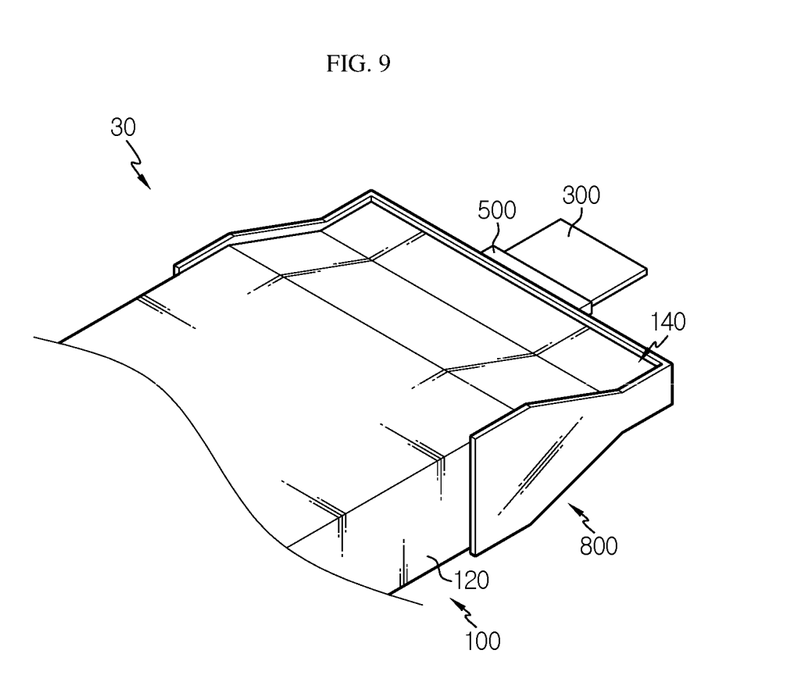
FIG. 9 is a diagram for illustrating a battery cell according to still another embodiment of the present disclosure.
Figure 10:
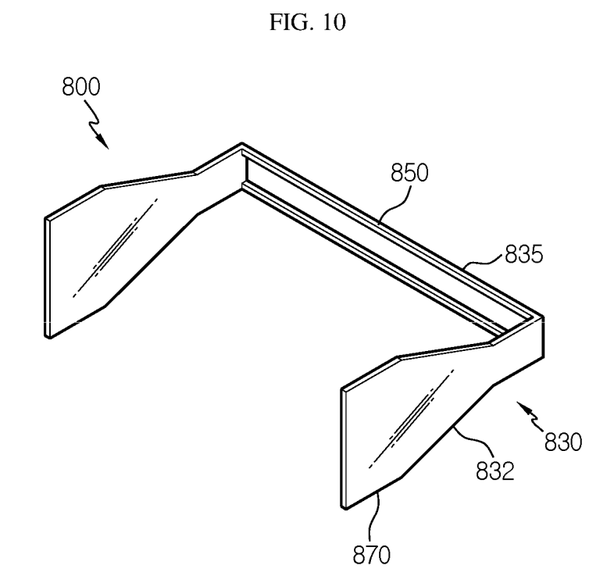
FIG. 10 is a diagram for illustrating a tab protection unit of the battery cell of FIG. 9.

FIG. 9 is a diagram for illustrating a battery cell according to still another embodiment of the present disclosure, and FIG. 10 is a diagram for illustrating a tab protection unit of the battery cell of FIG. 9.

The battery cell 30 according to this embodiment is similar to the battery cells 10, 20 of the former embodiments, and thus, hereinafter, features substantially identical or similar to the former embodiments will not be described in detail, and features different from the former embodiments will be described in detail.

Referring to FIGS. 9 and 10, a tab protection unit 800 of the battery cell 30 may cover a part of both side surfaces of the case body 120 of the battery case 100 and both side surfaces of the first terrace 142 (see FIG. 2) and the second terrace 146 (see FIG. 2) of the case terrace 140.

The tab protection unit 800 may include a terrace covering portion 830, a terrace slot 850, and a body covering portion 870.

The terrace covering portion 830 may include a side covering portion 832 and a guide band 835.

The side covering portion 832 is provided in a pair and may cover both side surfaces of the first terrace 142 (see FIG. 2) and the second terrace 146 (see FIG. 2) of the case terrace 140 (see FIG. 2). The guide band 835 may connect the pair of side covering portions 832.

The terrace slot 850 may be provided to the guide band 835.

The body covering portion 870 extends from the pair of side covering portions 832 and may cover a part of both side surfaces of the case body 120 of the battery case 100. The body covering portion 870 may be elastically mounted to both side surfaces of the case body 120.

As described above, in the battery cell 30 according to this embodiment, an external impact or the like at both side surfaces of the battery case 100 may be buffered by means of the protection unit 800 that covers a part of both side surfaces of the case body 120 of the battery case 100 and both side surfaces of the first terrace 142 and the second terrace 146 of the case terrace 140.

Figure 11:
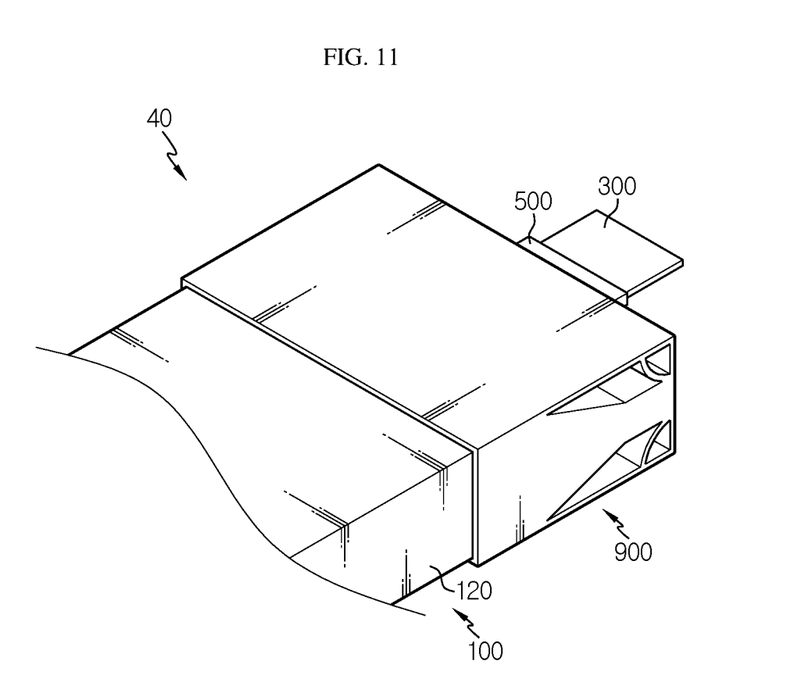
FIG. 11 is a diagram for illustrating a battery cell according to still another embodiment of the present disclosure.
Figure 12:
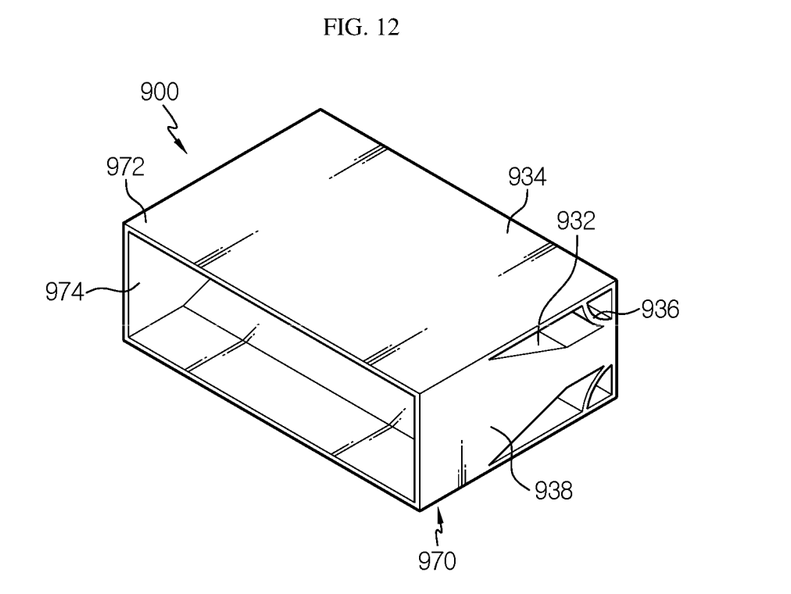
FIG. 12 is a diagram for illustrating a tab protection unit of the battery cell of FIG. 11.

FIG. 11 is a diagram for illustrating a battery cell according to still another embodiment of the present disclosure, and FIG. 12 is a diagram for illustrating a tab protection unit of the battery cell of FIG. 11.

The battery cell 40 according to this embodiment is similar to the battery cells 10, 20, 30 of the former embodiments, and thus, hereinafter, features substantially identical or similar to the former embodiments will not be described in detail, and features different from the former embodiments will be described in detail.

Referring to FIGS. 11 and 12, a tab protection unit 900 of the battery cell 40 may cover the upper and lower surfaces of the first terrace 142 and the second terrace 146 of the case terrace 140 of the battery case 100, respectively, at least dually, and also cover a part of both side surfaces of the case body 120 of the battery case 100 and both side surfaces of the first terrace 142 and the second terrace 146 of the case terrace 140.

The tab protection unit 900 may include a terrace covering portion 930, a terrace slot (not shown), and a body covering portion 970.

The terrace covering portion 930 may include a first covering part 932, a second covering part 934, an auxiliary buffering part 936, and a third covering portion 938.

The first covering part 932 may cover the first terrace 142 and the second terrace 146 of the case terrace 140. The second covering part 934 is spaced apart from the first covering part 932 by a predetermined distance and may cover the first covering part 932.

The auxiliary buffering part 936 is provided between the first covering part 932 and the second covering part 934 and may buffer an impact transmitted to the first covering part 932 when an external impact occurs.

The third covering portion 938 is provided in a pair and may cover both side surfaces of the first terrace 142 (see FIG. 2) and the second terrace 146 (see FIG. 2) of the case terrace 140 (FIG. 2).

The terrace slot, not shown, is similar to the former embodiment, and thus will not be described again.

The body covering portion 970 may include a first body covering portion 972 and a second body covering portion 974.

The first body covering portion 972 may at least partially cover the upper surface and the lower surface of the case body 120 of the battery case 100. The second body covering portion 974 may at least partially cover both side surfaces of the case body 120 of the battery case 100.

As described above, the battery cell 40 according to this embodiment may cover a part of the upper surface, the lower surface and both side surfaces of the case body 120 of the battery case 100 and all of the upper surface, the lower surface and both side surfaces of the case terrace 140, by means of the tab protection unit 900.

Figure 13:
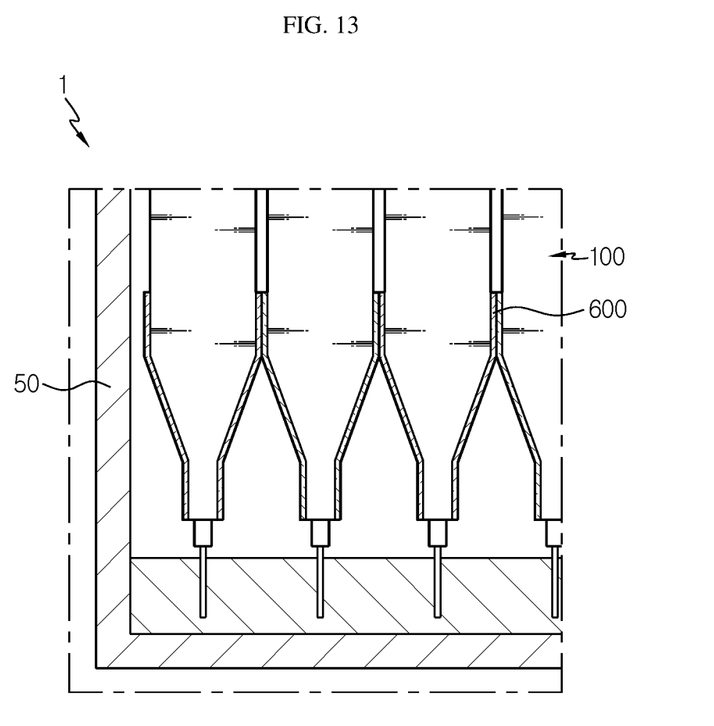
FIG. 13 is a diagram for illustrating battery module according to an embodiment of the present disclosure.
Figure 14:
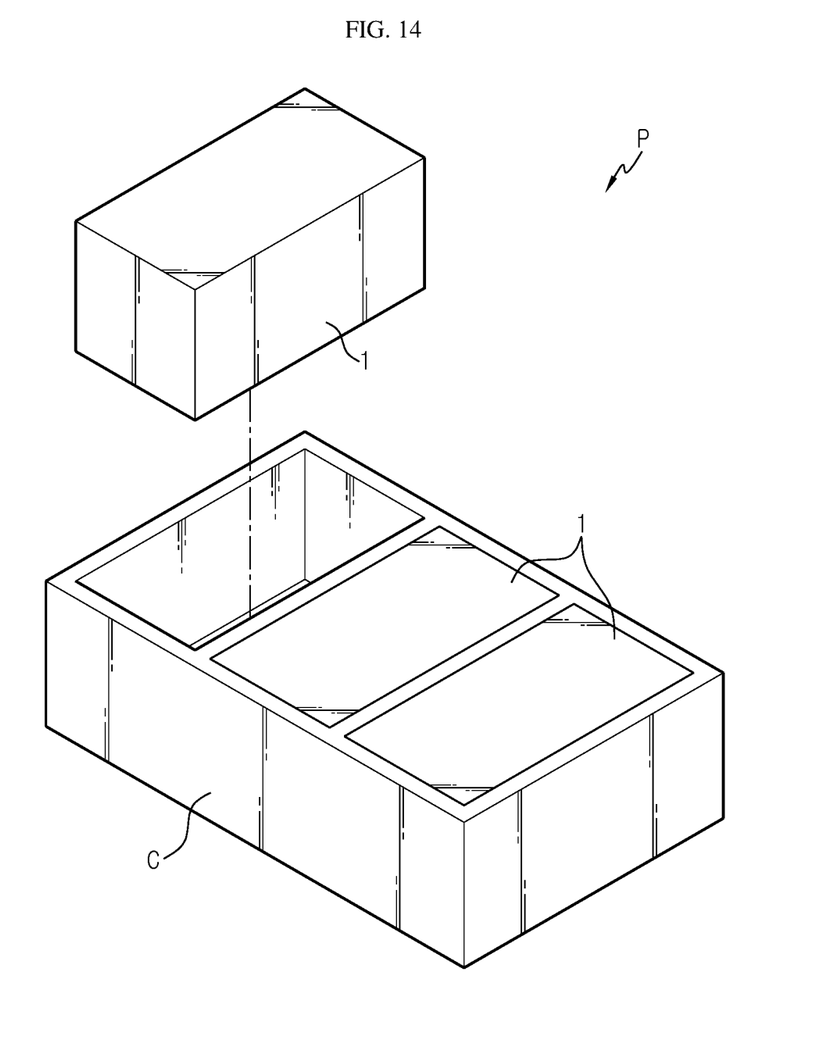
FIG. 14 is a diagram for illustrating a battery pack according to an embodiment of the present disclosure.

FIG. 13 is a diagram for illustrating battery module according to an embodiment of the present disclosure, and FIG. 14 is a diagram for illustrating a battery pack according to an embodiment of the present disclosure.

Referring to FIG. 13, a battery module 1 may include at least one battery cell 10 provided with the tab protection unit 600 of the former embodiment and a module case 50 for accommodating the at least one battery cell 10. Although not shown, the battery module 1 may also be configured to include at least one battery cells among the battery cells 20, 30, 40 of the former embodiments, other than the at least one battery cell 10.

Referring to FIG. 14, a battery pack P may include at least one the battery module 1 and a pack case C for packaging the at least one battery module 1.

Since the battery module 1 and the battery pack P include the battery cells 10, 20, 30, 40 of the former embodiments, it is possible to provide the battery module 1 and the battery pack P having all the advantages of the battery cells 10, 20, 30, 40 of the former embodiments.

Here, the battery pack P may be provided in a vehicle, a power storage device or other devices or instruments using the battery pack P as an energy source, and in this case, it is possible to provide a device or instrument having all the advantages of the battery cells 10, 20, 30, 40 of the former embodiments.

According to various embodiments as described above, there is provided a battery cell 10, 20, 30, 40 capable of protecting the electrode tab 400 from an external impact or the like, a battery module 1 including the battery cell 10, 20, 30, 40, and a battery pack P including the battery module 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery cell, comprising:
a battery case providing an exterior appearance of the battery cell, the battery case including a case body and a case terrace extending from the case body;
a battery assembly accommodated in the battery case, the battery case extending around an entirety of the battery assembly, the case body overlapping the entirety of the battery assembly;
an electrode lead electrically connected to the battery assembly and protruding out of the case terrace;
an electrode tab disposed in the battery case and protruding from the battery assembly, the electrode tab connecting the electrode lead with the battery assembly, the case terrace overlapping an entirety of the electrode tab that protrudes from the battery assembly and a portion of the electrode lead; and
a tab protection unit at least partially surrounding an outer surface of the battery case at a portion where the electrode tab is disposed so that the electrode tab is protected from an external impact, the tab protection unit covering and being in surface contact with an entirety of upper and lower surfaces of an outside of the case terrace, the tab protection unit overlapping the entirety of the electrode tab that protrudes from the battery assembly,
wherein the tab protection unit is not electrically connected to the electrode tab or the electrode lead.

2. The battery cell according to claim 1, wherein the tab protection unit covers at least one of: an upper surface, a lower surface, or both side surfaces of the battery case.

3. The battery cell according to claim 1,
wherein the case terrace includes:
a first terrace configured to accommodate the electrode tab; and
a second terrace extending from the first terrace, the electrode lead at least partially protruding out of the second terrace,
wherein the tab protection unit covers the first terrace at least partially.

4. The battery cell according to claim 3, wherein the tab protection unit covers at least one of: an upper surface or a lower surface of the first terrace.

5. The battery cell according to claim 4, wherein the tab protection unit covers both of the upper surface and the lower surface of the first terrace.

6. The battery cell according to claim 3, wherein the tab protection unit covers opposite side surfaces of the first terrace.

7. The battery cell according to claim 1, wherein the tab protection unit is elastically mounted to the battery case.

8. A battery module, comprising:
- at least one battery cell, each battery cell according to claim 1; and
- a module case configured to accommodate the at least one battery cell.

9. A battery pack, comprising:
- at least one battery module, each battery module according to claim 8; and
- a pack case configured to package the at least one battery module.

10. The battery cell according to claim 1, wherein the tab protection unit includes a first covering part that contacts and extends along the case terrace, a second covering part that is spaced apart from the first covering part and covers the first covering part, and an auxiliary buffering part that extends between the first covering part and the second covering part.

* * * * *